OPTICAL SOUND REPRODUCING SYSTEM

Filed Aug. 28, 1946 2 Sheets-Sheet 1

INVENTOR.
Jack R. Sanders

Nov. 7, 1950 J. R. SANDERS 2,529,050

OPTICAL SOUND REPRODUCING SYSTEM

Filed Aug. 28, 1946 2 Sheets-Sheet 2

INVENTOR.
Jack R. Sanders

Patented Nov. 7, 1950 2,529,050

UNITED STATES PATENT OFFICE 2,529,050

OPTICAL SOUND REPRODUCING SYSTEM

Jack R. Sanders, New York, N. Y.

Application August 28, 1946, Serial No. 693,501

1 Claim. (Cl. 179—100.3)

This invention relates primarily to a method and means for producing and utilizing a sound record.

Heretofore the conventional disc or cylinder record with its wavy sound track cut mechanically by a vibrating graver, and playing back by means of a needle set into vibration by the mechanical action of the sound track, has been subject to severe limitations both as to the number of lines which may be cut on a given effective surface, thus limiting the duration of the material which may be recorded and played back, and as to the ability to record and reproduce the higher harmonics in the sound to be recorded, thus impairing the fidelity of the reproduction. Attempts to avoid these mechanical limitations by the use of a photo-electric system have not heretofore been successful in practice since there has been no available means to cause the light system to follow sharply a closely spaced sound track on a rotating disc or cylinder.

The main object of this invention is to provide a method of recording which will give high fidelity and which will allow the location of considerably more sound material on a given area as compared to standard practice today.

Another object is to eliminate the mechanical transmission between the sound track and the acoustical device, thus avoiding the limitations inherent in a mechanical playback system.

Another object is to provide, in connection with a photographic sound track, means for automatically causing the light system to follow steadily the course of the sound track.

To achieve these objects I utilize a transparent disc or cylinder, on one surface of which a continuous groove has been cut, and which is provided with a surface of photosensitive material. The sound impulses are converted into light of corresponding intensity and pulse frequency; and the beam of light is guided along the groove to record on the photosensitive surface. The record, then, consists of a processed surface bearing a sound track, on a transparent disc or cylinder bearing a guide groove in fixed relation to the sound track. On playback the record is caused to travel relative to a pencil of steady light directed on the sound track by means of the guide groove, the resulting interrupted beam being received by a photoelectric tube or similar light sensitive device operating an acoustical device.

While I have spoken hereinabove in terms of sound reproduction, it is obvious that my invention is a method of recording as a photographic track, and later transmitting, any set of impulses which can be transformed into a temporal series of impulses.

In disc form, the record blank comprises a disc of transparent material bearing on its face a pre-cut spiral groove, preferably of uniform width and depth, but which may be jogged, or otherwise varied in width, depth or other characteristics as may be convenient; and bearing a light sensitive film, conveniently as a uniform layer on a plane parallel to that of the groove. In making the recording, the sound is picked up and translated into an electric current which operates a glow tube, or similar responsive light emitter, to provide a narrow varying beam of light. The beam of light passes lengthwise through a transparent needle whose point lodges in the groove and is guided therein. The record blank, being mounted on a turntable rotates, and as it rotates, the pencil of light issuing from the point of the needle follows the groove, and, operating through the transparent material of the disc, affects the photosensitive film in a spiral pattern of variable density and spacing.

In the playback of the record disc, light from a constant source is led through a transparent needle which is guided in or by the groove to provide a narrow beam directed on the sound record on the film, and passes through or is reflected from the latter, and then enters a photoelectric tube for conversion into sound.

It will be seen that the sound track is on the film, and the groove on the face of the record functions only as a guide for the light beam. As a result the width of the groove and its side walls need be only a fraction of the conventional sound track; and it is feasible to cut on the disc many more lines per radial inch. Thus a more compact recording may be made, or, contrariwise, much more material may be recorded on the usual size disc. The photographic sound track may, of course, be much smaller in dimension than the mechanical track in use, thereby permitting a much greater frequency range with correspondingly greater overall fidelity and decreased turntable speed which results in a further increase in the playing time of the record.

Other objects and advantages of my invention will become apparent from the detailed description hereinbelow of a preferred embodiment of my invention, taken in connection with the drawings, in which Figure 1 is plan view showing a record blank according to my invention mounted on a turntable.

Figure 1:
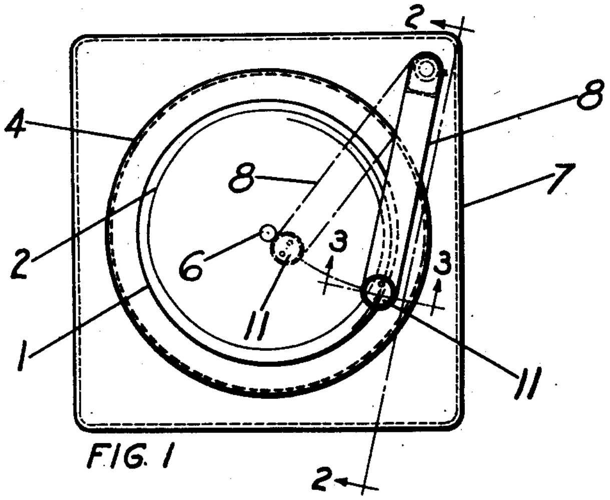
Figure 2:
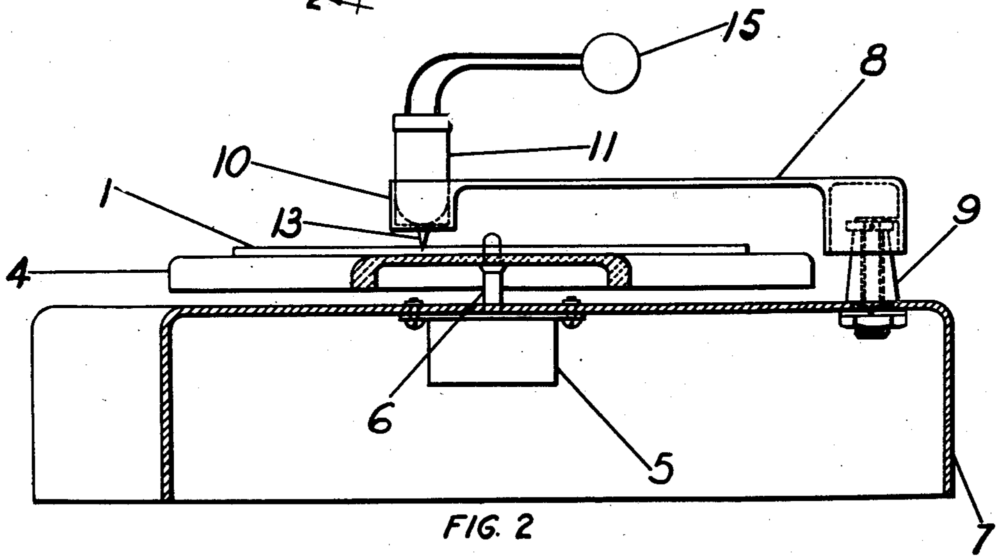
Figure 2 is an enlarged cross-sectional view taken along the line 2—2 in Figure 1 showing the record blank mounted for recording.
Figure 3:
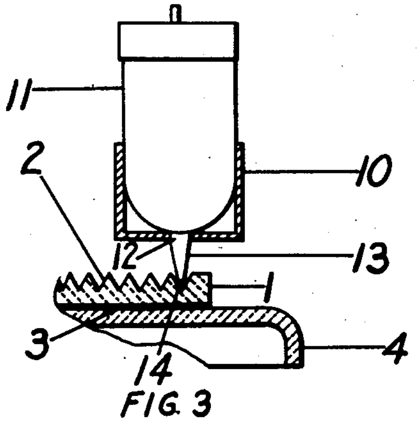
Figure 3 is an enlarged cross-sectional detail taken along the line 3—3 of Figure 1, looking in the direction of the arrow.
Figure 4:
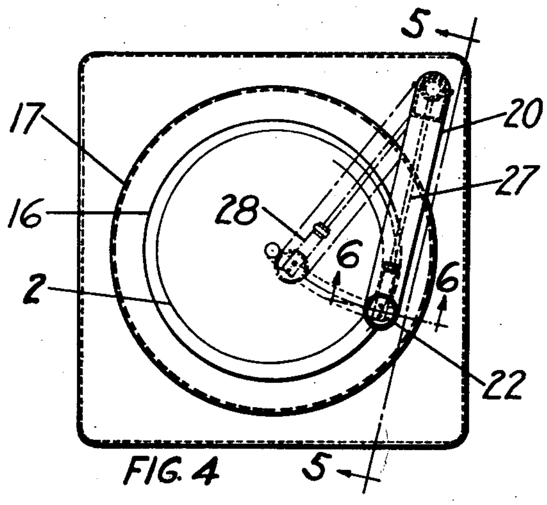
Figures 5, 6:
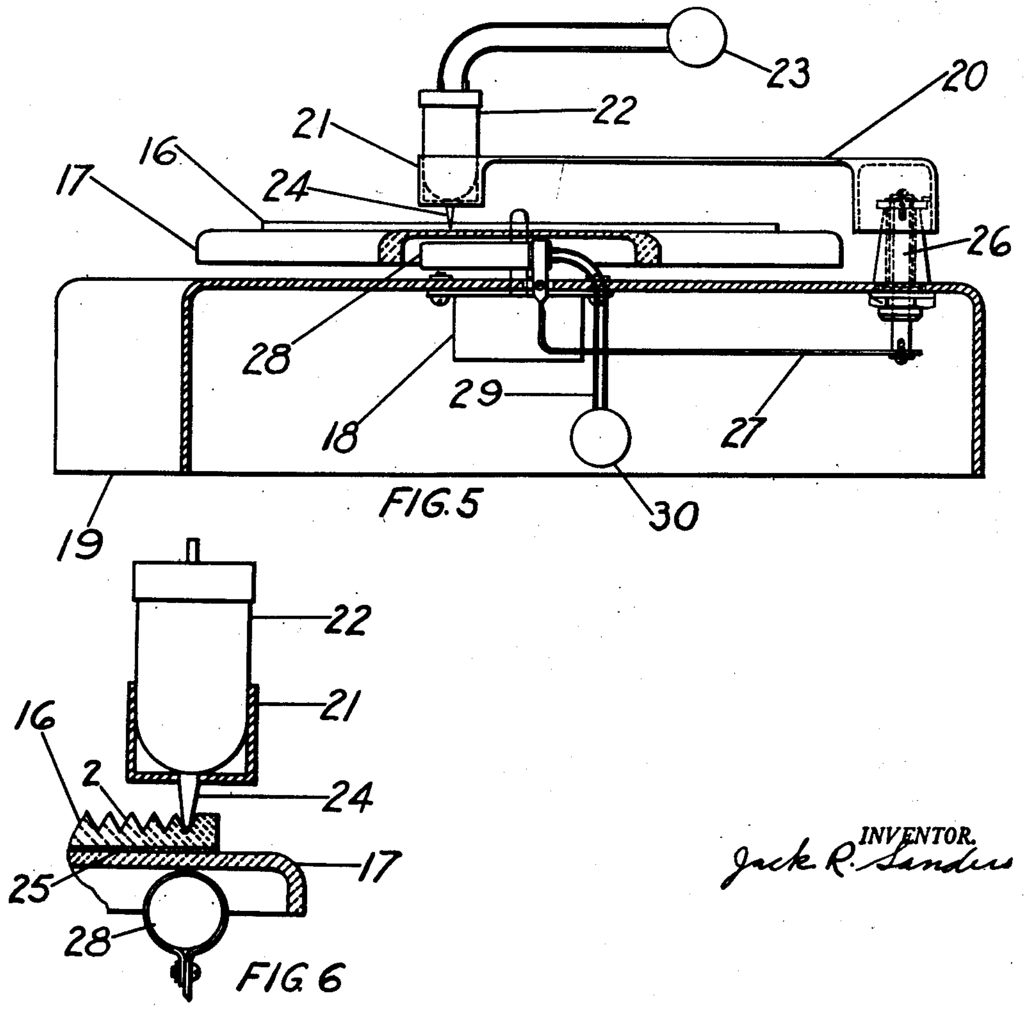

Figures 4, 5, and 6 are figures respectively similar to Figures 1, 2, and 3 showing the record mounted for playback.

Figure 7:
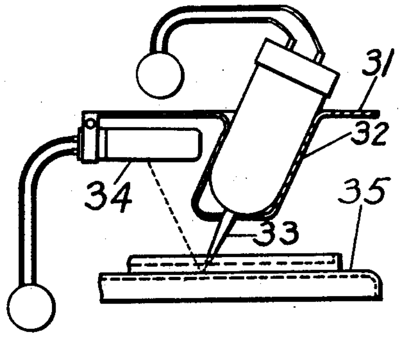

Figure 7 is an enlarged partial detail of Figure 5, as modified, to show a reflective playback.

The record blank comprises a circular disc 1 made of any convenient transparent material. On the upper surface of disc 1 a continuous spiral groove 2, of uniform width and depth, is cut or otherwise provided, closely packing the effective area of the disc. In the drawing, the groove is shown conventionally, only a few turns, widely spaced, being drawn. The bottom face of the disc is provided with a film 3 of photosensitive material.

To make a record, the blank 1 is mounted on a turntable 4 which may be driven by the conventional motor 5 and spindle 6 mounted on a base 7 of any convenient structure. A swinging arm 8 is pivotally mounted on the base at one end, as at 9, in a manner usual in the art, and extends over and across the record blank. At its free end the arm 8 is provided with a socket 10, of a size adequate to receive a tube 11. The bottom of the socket is provided with a perforation adapted to receive the base 12 of a tapering needle 13, the point 14 of which is lodged in the groove 2 so that as the turntable rotates, the arm is caused to swing from the full line position to the dot-and-dash line position shown in Figure 1. The tube 11 may be a glow tube having an output of light directly responsive to fluctuations of incoming electric signal strength, or may be any similarly responsive source of light. It is connected electrically to a microphone 15 or similar system for converting sound to electric impulses. The needle 13 is such as to channel a narrow beam of the light from the glow tube 11 to an exit at the point 14. Preferably, it is made of a hard, transparent material such as sapphire, glass or the like, and may have its sides covered with opaque material.

In making the record the microphone apparatus 15 picks up the sound and furnishes the glow tube 11 with a fluctuating voltage, all in a manner well known in the art. The glow tube 11 emits light fluctuating with the impressed voltage, and the light channelled through the needle, issues at the needle point 14 as a narrow pencil of light which is directed through the transparent material of 1 to affect the film 3. As the turntable is rotated a spiral pattern is impressed upon the photosensitive film which can then be developed and fixed in situ. As a result a record has been made having a guide groove permanently in register with the sound track. It is clear that this registry is achieved by means of the light beam, and that the actual geometrical relation of the sound track may be varied, without losing such registration, by varying the direction or path of the light beam as convenience may require.

The record thus having been made, its playing back follows roughly the same principle. Referring now to Figures 4 and 5, a record 16 of this construction, is placed on a turntable 17 of transparent material adapted to be rotated by a conventional driving motor 18, mounted on a suitable base 19. The base 19 carries, pivotally mounted, a swinging arm 20 of construction similar to that of arm 8 hereinabove described. In the socket 21 is a source of constant light 22 activated by an appropriate source of power 23. The needle 24, of nature similar to the recording needle heretofore described, is engaged in the guide groove 2 and will transmit a narrow beam of light longitudinally and direct the same against the sound track on the film 25. The pivot 26 on which the arm 20 is pivoted carries a lower arm 27 mounted to move with arm 20. The arm 27 is adapted to support a photo-electric tube 28 beneath the turntable and in position to receive light from the needle 24 which has passed through the sound track 25. The photo-electric tube 28 is connected by leads 29 to a loud speaker or similar acoustic device 30.

In the above, I have described the playback as being effectuated by light transmitted through the sound track; but it is clear that that is not essential. Since the guide groove enables the sound track to be followed steadily by the pencil of light, the needle may be set at an angle and the photo-electric tube may be placed so as to receive light impulses by reflection from the sound track. In Figure 7 I have shown a modification for that purpose. In this case, instead of the double arm 20, 27 of Figure 5, I use a single swinging arm 31 provided with a socket 32 for the light source having provisions for holding the needle 33 at an angle to the groove. Spaced from the socket in position to receive the light reflected from the sound record, is the photo-electric tube 34 which may be secured to the arm in any convenient manner. The surface 35 of the turntable may be a reflector, or a reflecting surface may be applied to the back of the record. It is of course obvious that in recording, the needle may likewise enter the groove at any fixed angle.

Numerous other variations and modifications of this invention can obviously be made without departing from its spirit and scope, and it is to be understood that this invention, as defined in the claim hereto, is not limited to the exact methods and devices described by way of illustration hereinabove.

I claim:

Apparatus for reproducing sound comprising a rotatable record of transparent material carrying a photographic sound track, a groove cut in a surface of the record and in register with the sound track, a source of light, a member of transparent material engaged in and moved by the groove and disposed to receive light from the source and direct the same into the groove and upon the sound track, and means to receive for conversion into sound the light affected by the sound track.

JACK R. SANDERS.

REFERENCES CITED

The following references are of record in the file of this patent:

UNITED STATES PATENTS

| Number | Name | Date |
|---|---|---|
| 1,956,626 | Robbins | May 1, 1934 |
| 2,092,892 | Runge | Sept. 14, 1937 |
| 2,094,723 | Schmidt et al. | Oct. 5, 1937 |
| 2,123,323 | Von Mihaly | July 12, 1938 |
| 2,150,823 | Eggert et al. | Mar. 14, 1939 |
| 2,416,135 | Appleby | Feb. 18, 1947 |